(12) United States Patent
Syed et al.

(10) Patent No.: US 7,285,869 B2
(45) Date of Patent: Oct. 23, 2007

(54) METHOD FOR ESTIMATING ENGINE POWER IN A HYBRID ELECTRIC VEHICLE POWERTRAIN

(75) Inventors: Fazal Syed, Canton, MI (US); Ming Kuang, Canton, MI (US); John Czubay, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 11/161,344

(22) Filed: Jul. 29, 2005

(65) Prior Publication Data

US 2006/0022469 A1   Feb. 2, 2006

Related U.S. Application Data

(60) Provisional application No. 60/592,198, filed on Jul. 29, 2004.

(51) Int. Cl.
*F02D 29/06* (2006.01)
(52) U.S. Cl. ............ 290/40 C; 290/40 A; 290/40 B; 290/34; 290/40 R; 322/28; 322/29; 322/40; 180/65.3; 180/65.2; 701/22; 701/93; 701/102; 701/113
(58) Field of Classification Search .......... 290/40 C, 290/40 A, 40 B, 49 R; 322/28; 180/65.2, 180/65.3; 701/22, 93, 102, 113
See application file for complete search history.

(56) References Cited

U.S. PATENT DOCUMENTS

| | | | |
|---|---|---|---|
| 5,285,111 A | 2/1994 | Sherman | |
| 5,343,970 A | 9/1994 | Severinsky | |
| 5,637,987 A | 6/1997 | Fattic et al. | |
| 5,722,502 A | 3/1998 | Kubo | |
| 5,775,449 A | 7/1998 | Moroto et al. | |
| 5,823,281 A | 10/1998 | Yamaguchi et al. | |
| 5,846,155 A | 12/1998 | Taniguchi et al. | |
| 6,116,363 A | 9/2000 | Frank | |
| 6,208,034 B1 | 3/2001 | Yamaguchi | |
| 6,209,672 B1 | 4/2001 | Severinsky | |
| 6,269,290 B1 | 7/2001 | Egami et al. | |
| 6,328,671 B1 | 12/2001 | Nakajima et al. | |
| 6,336,063 B1 | 1/2002 | Lennevi | |
| 6,362,602 B1 | 3/2002 | Kozarekar | |
| 6,364,807 B1 | 4/2002 | Koneda et al. | |
| 6,367,570 B1 * | 4/2002 | Long et al. ............... | 180/65.2 |
| 6,405,818 B1 | 6/2002 | Anthony et al. | |
| 6,490,511 B1 | 12/2002 | Raftari et al. | |
| 6,533,693 B2 | 3/2003 | Bowen et al. | |
| 6,553,287 B1 | 4/2003 | Supina et al. | |
| 6,555,927 B1 | 4/2003 | Suzuki et al. | |
| 6,563,230 B2 * | 5/2003 | Nada ....................... | 290/40 C |
| 6,569,055 B2 * | 5/2003 | Urasawa et al. ............. | 477/5 |
| 6,591,173 B2 * | 7/2003 | Nada ........................ | 701/29 |
| 6,664,651 B1 * | 12/2003 | Kotre et al. .............. | 290/29 |

(Continued)

*Primary Examiner*—Darren Schuberg
*Assistant Examiner*—Iraj A. Mohandesi
(74) *Attorney, Agent, or Firm*—David B. Kelley; Brooks & Kushman (57) ABSTRACT

A method is disclosed for estimating engine power output for an engine in a hybrid electric vehicle powertrain that includes an electric motor and an electric generator. Selected powertrain variables, including electric motor torque and electric generator torque, are used in determining desired vehicle traction wheel torque and an estimated engine power. A calibrated delay in calculating estimated engine power following a time sampling of the values for motor torque and generator torque avoid inertial effects.

5 Claims, 6 Drawing Sheets

U.S. PATENT DOCUMENTS

| | | |
|---|---|---|
| 6,686,724 B2 | 2/2004 | Coates et al. |
| 6,688,411 B2 | 2/2004 | Boggs et al. |
| 6,692,405 B2 | 2/2004 | Minowa et al. |
| 6,701,880 B1 * | 3/2004 | Gauthier et al. ......... 123/179.3 |
| 6,717,281 B1 * | 4/2004 | Brandon et al. .......... 290/40 C |
| 6,856,035 B2 * | 2/2005 | Brandon et al. .......... 290/40 C |
| 6,902,018 B2 | 6/2005 | Hisada et al. |
| 7,013,213 B2 * | 3/2006 | McGee et al. .............. 701/113 |
| 2003/0074115 A1 | 4/2003 | Yamaguchi et al. |
| 2004/0006414 A1 | 1/2004 | Suzuki |
| 2004/0168840 A1 | 9/2004 | Kuang et al. |
| 2005/0061562 A1 | 3/2005 | Mack |
| 2005/0068007 A1 | 3/2005 | Prema et al. |

* cited by examiner

METHOD FOR ESTIMATING ENGINE POWER IN A HYBRID ELECTRIC VEHICLE POWERTRAIN

CROSS-REFERENCE TO RELATED APPLICATIONS

This application claims the benefit of U.S. provisional application Ser. No. 60/592,198, filed Jul. 29, 2004.

BACKGROUND OF THE INVENTION

1. Field of the Invention

The invention relates to a method for managing power distribution in a hybrid electric vehicle and for obtaining an estimate of engine power for use in determining a desired vehicle traction wheel torque.

2. Background Discussion

A so-called power split hybrid electric vehicle powertrain has two power sources and a parallel power flow path under a first set of operating conditions and a series power flow path under another set of operating conditions. A first power source is an engine and generator subsystem, including a planetary gear set that mechanically couples the engine and the generator. A second power source is an electric drive comprising a motor/generator/battery subsystem. The battery is an energy storing medium for the generator and the motor. The generator and the motor can be referred to as electric machines since either is capable of acting as a motor under certain driving conditions and as a generator under other driving conditions.

A vehicle system controller will maintain the vehicle at its maximum performance value by managing the power distribution among the various components of the vehicle powertrain. It manages the operating states of the engine, the generator, the motor and the battery to maximize total vehicle efficiency.

The vehicle system controller will ensure that power management for optimum vehicle performance and drivability is maintained as it commands a desired engine torque and interfaces with a transmission control module. Based upon a commanded wheel torque and engine speed, the transmission control module determines a motor torque to effect a desired wheel torque. It also commands a generator torque to control the engine to achieve a desired engine speed.

For the purpose of disclosing the present invention, reference will be made to a so-called series-parallel hybrid powertrain configuration, although the invention is not limited to use in a powertrain configuration of that type.

In a series-parallel powertrain configuration, a motor torque control must coordinate a wheel torque command and a generator torque command. It should compensate for the inertia effect of the generator and the gearing elements to which the generator is connected. This will ensure that the vehicle system controller wheel torque command is fulfilled without wheel torque fluctuations. In the alternative, the control should use control algorithms that use variables not affected by inertial torque of the powertrain elements.

In a hybrid electric vehicle of this type, the battery power must be controlled under various driving conditions, including transient torque demands during accelerator "tip-in" and "tip-out" events, as well as steady-state driving. This must be done within the battery maximum power limits in order to avoid system failures and battery damage and to increase battery life.

The vehicle system controller in a hybrid electric vehicle powertrain will interact with the motor, the generator and the engine by requesting a desired wheel torque, a desired engine speed and a desired engine torque. One of the steps that can help in controlling the battery to prevent a command for battery power in excess of the maximum battery power limits is to correctly estimate the engine power.

The vehicle system controller should use a strategy that will take into account the functions of the generator, the engine, the motor, and the various system controllers as driving conditions change. This can be done by correctly calculating an estimate for engine power to ensure that the battery power stays within the maximum battery power limits under all conditions, including accelerator tip-in events, tip-out events and other transient torque demand events, as well as during steady-state driving.

SUMMARY OF THE INVENTION

A split power hybrid electric vehicle powertrain with an engine and an electric motor includes a parallel powertrain operating mode. Engine power is divided into two torque flow paths using a planetary gear set comprising a sun gear connected to the generator, a carrier connected to the engine, and a planetary ring gear connected to the vehicle traction wheels through torque transfer countershaft gearing and a vehicle differential-and-axle assembly. An electric motor is electrically coupled to the generator and the battery.

By controlling the generator, a mechanical torque flow path from the engine to the carrier to the ring gear to the countershaft gearing is established, and an electrical torque flow path is established from the engine to the generator to the motor and to the countershaft gearing. Engine power is divided into parallel power flow paths by controlling the engine speed to a desired value, which results in a defined generator speed for a given ring gear speed. The generator speed will change according to vehicle speed for a definite desired engine speed, and the engine speed can be decoupled from the vehicle speed.

According to a first embodiment of the invention, engine power can be calculated using desired wheel torque request by the vehicle system controller, the current motor torque, and the current generator torque. The vehicle system controller makes repetitive calculations of engine power during continuous control loops using wheel torque information distributed by the transmission control module. The determination of a desired wheel torque is delayed by a calibrateable time in order to compensate for the fact that current values for motor torque and generator torque used by a transmission control module (TCM) correspond to a wheel torque request previously distributed to the transmission control module during a previous control loop of the vehicle system controller. The calibrateable delay is obtained by determining a calibrated variable that delays a determination of desired wheel torque used for calculating the engine power during a current control loop of the vehicle system controller.

The method of the invention thus does not need to use inertial terms for calculating estimated engine power. Therefore, it does not require heavy filtering during changes in desired wheel torque. It can develop desired commands by the vehicle system controller that can be used during transient events such as accelerator "tip-in" and "tip-out" conditions, as well as during steady-state operation of the powertrain.

The estimation of engine power using the method of the invention, as indicated above, relies on desired wheel torque, motor torque and generator torque. If, for some reason, motor torque is limited regardless of the magnitude of the desired wheel torque that is calculated, an estimate of engine torque then may tend to become inaccurate. According to another feature of the invention, this condition is avoided by also calculating engine power using engine torque and engine speed. This engine power estimate then can be modified by using an engine speed rise command and an engine speed fall command during accelerator "tip-in" events and accelerator "tip-out" events to compute the maximum and minimum possible engine power.

According to a second embodiment of the invention, generator torque and generator inertia torque can be used to estimate current engine torque available in a calculation of engine power. That procedure would provide a useful engine power available value for steady-state driving, but it may have limitations as an appropriate value for available power during transient operating events unless the system uses heavy filtering, or unless the vehicle system controller includes an electronic central processor unit (CPU) with a high data processing speed.

DETAILED DESCRIPTION OF AN EMBODIMENT OF THE INVENTION

Figure 1:
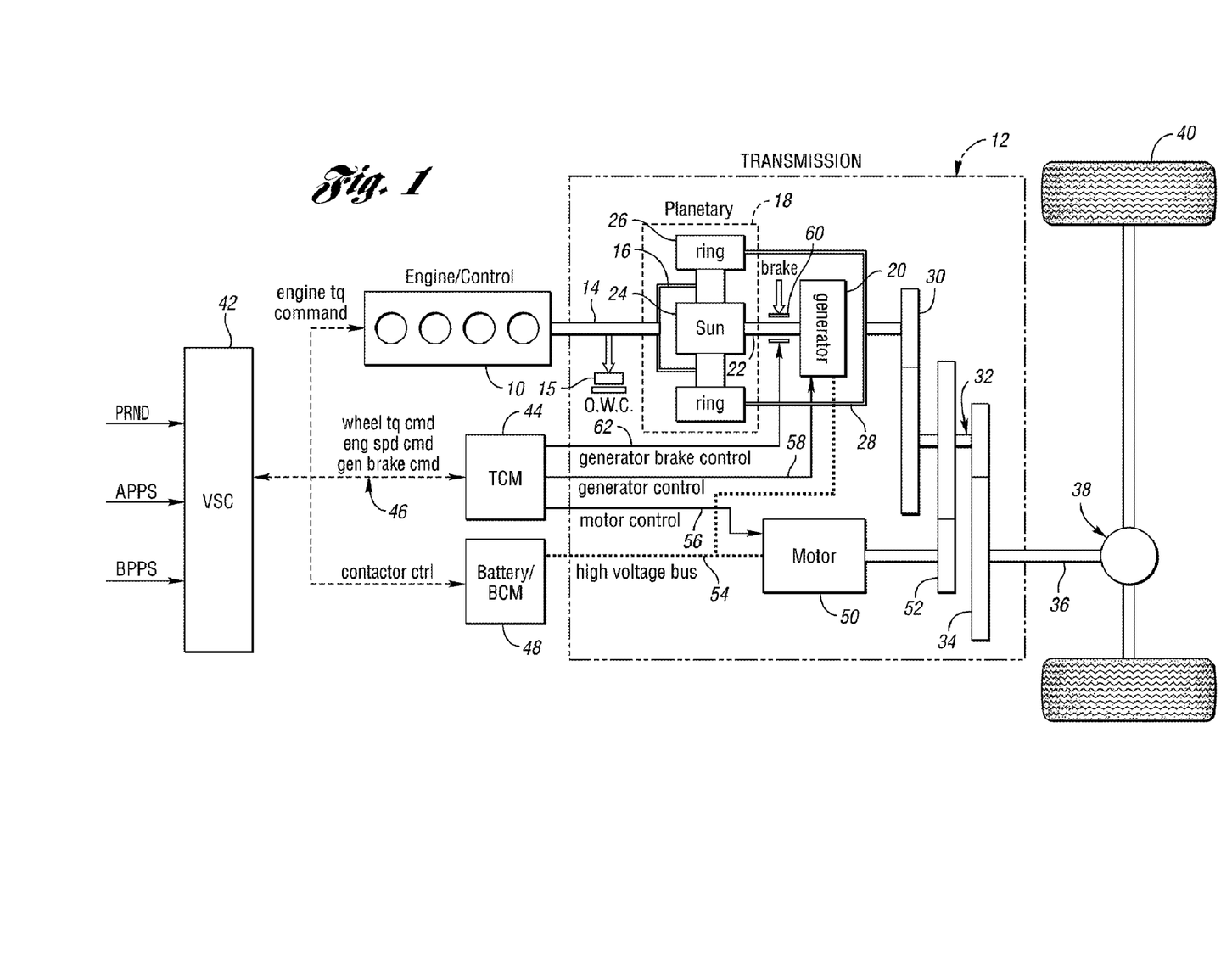
FIG. 1 is a schematic system diagram of a split power powertrain for a hybrid electric vehicle.

FIG. 1 is a schematic diagram of a series-parallel hybrid electric vehicle powertrain capable of carrying out the control functions of the invention.

The configuration of FIG. 1 includes an internal combustion engine 10 and a power transmission 12. The engine crankshaft of the engine 10, which would correspond to the transmission torque input shaft 14, is connected drivably to the carrier 16 of a planetary gear unit 18. An electric generator 20, which, as mentioned previously, may act as a motor under certain operating conditions, is connected mechanically by shaft 22 to sun gear 24 of planetary gear unit 18. Carrier 16 rotatably supports pinions that engage sun gear 24 and planetary ring gear 26.

A torque transmitting element 28 transfers ring gear torque to torque input element 30 of countershaft gearing 32. An output gear element 34 of the countershaft gearing 32 is connected drivably, as shown at 36, to a differential-and-axle assembly generally indicated at 38, whereby torque is transferred to vehicle traction wheels 40.

A vehicle system controller (VSC) 42 is electrically coupled to a transmission control module (TCM) 44 and to a controller for engine 10. Torque command signals are distributed by the vehicle system controller through signal flow paths, generally indicated at 46, to the engine control. Signal flow paths 46 provide signal communication also between the vehicle system controller 42 and the transmission control module (TCM) 44. A battery and battery control module (BCM) 48 is electrically coupled through signal flow paths 46 to the vehicle system controller 42.

The generator 20 is electrically coupled to electric motor 50. The rotor of motor 50 is mechanically connected to motor torque input gear 52 for the countershaft gearing 32. The electrical coupling between the generator 20 and the motor is provided by a high voltage bus 54, powered by the battery and battery control module 48.

The transmission control module is in communication with the motor 50 through motor control signal flow path 56. The generator communicates with the transmission control module through signal flow path 58, a generator brake, which is indicated at 60, is electrically connected to the transmission control module through signal flow path 62.

When brake 60 is applied, engine power is transmitted through a fully-mechanical torque flow path from the engine, through the planetary gear unit 18 and through the countershaft gearing 32 to the traction wheel-and-axle assembly.

During normal hybrid electric powertrain operation, the brake 60 would be released and the generator 20 would apply reaction torque to the sun gear, thereby establishing parallel torque flow paths from the engine to the differential-and-axle assembly, and from the motor-generator subsystem through the countershaft gear assembly 32 to the wheel-and-axle assembly.

The powertrain system schematically illustrated in FIG. 1 may rely upon a fully electric motor drive or upon both motor and engine power to achieve maximum efficiency. The system of FIG. 1 may generate electrical power while driving the vehicle using generator power output. The vehicle system controller will maintain the vehicle at its maximum performance point by managing the power distribution among the various components of the vehicle. It manages the operating state of the engine, the generator, the motor, and the battery to maximize total vehicle efficiency. The battery is an energy storage system for the generator and the motor.

Figure 2:
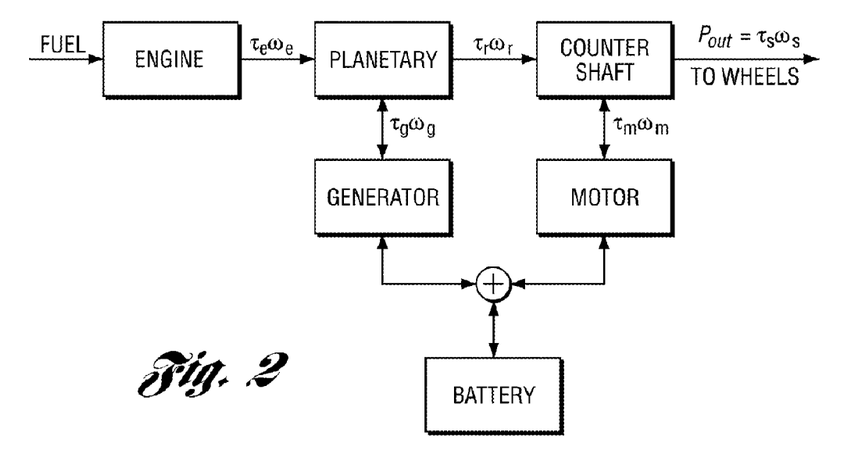
FIG. 2 is a powertrain system power flow diagram for the powertrain illustrated in FIG. 1.

As indicated in FIG. 2, the engine power can be split into two power flow paths by controlling the generator to effect a mechanical power flow path from the engine 10 to the carrier of the planetary gear unit 18, to the ring gear of the planetary gear unit and to the countershaft gearing 32. An electrical power flow path is established from the engine 10 to the generator 20, to the motor 50 and to the countershaft gearing 32.

The engine power is split by controlling the engine speed to a desired value, which results in a definite generator speed for a given ring gear speed. The generator speed will change according to vehicle speed for a given desired engine speed, and the engine speed can be decoupled from the vehicle speed. The changing generator speed will vary the engine output power split between the electrical power flow path and the mechanical power flow path.

The control of engine speed results in a generator torque to react against the engine output torque. This generator reaction torque conveys the engine output torque to the ring gear of the planetary gear set and eventually to the wheels. This mode of operation is called "positive split."

Because of the kinematic properties of the planetary gear set, the generator can rotate in the same direction as the direction of the torque that reacts against the engine output torque. In this operating mode the generator inputs power to the planetary gear set to drive the vehicle. This operating mode is called "negative split." As in the case of the "positive split" mode, the generator torque that results from the generator speed control reacts against the engine output torque and distributes engine output torque to the vehicle traction wheels. This combination of the motor, the generator, and the planetary gear set acts as an electromechanical continuously variable transmission.

When the generator brake is actuated to effect a parallel mode operation, the sun gear is locked from rotating and the generator braking torque provides the reaction torque that opposes engine output torque. In this mode of operation, all the engine output torque is transmitted, with a fixed gear ratio, to the vehicle traction wheels through a mechanical torque flow path.

This power split powertrain system, unlike a conventional vehicle powertrain, requires either generator torque resulting from engine speed control or generator brake torque to transmit engine output power through both an electrical and a mechanical power flow path or solely through the mechanical parallel path to effect forward motion of the vehicle.

The second power source causes electric motor power to be drawn from the battery to provide propulsion independently of the engine to drive the vehicle in either a forward direction or a reverse direction. This mode of operation is called "electric drive." In addition, the generator can draw power from the battery and drive against a one-way clutch on the engine output shaft to propel the vehicle in a forward direction. This mode of operation is called "generator drive."

Figure 3:
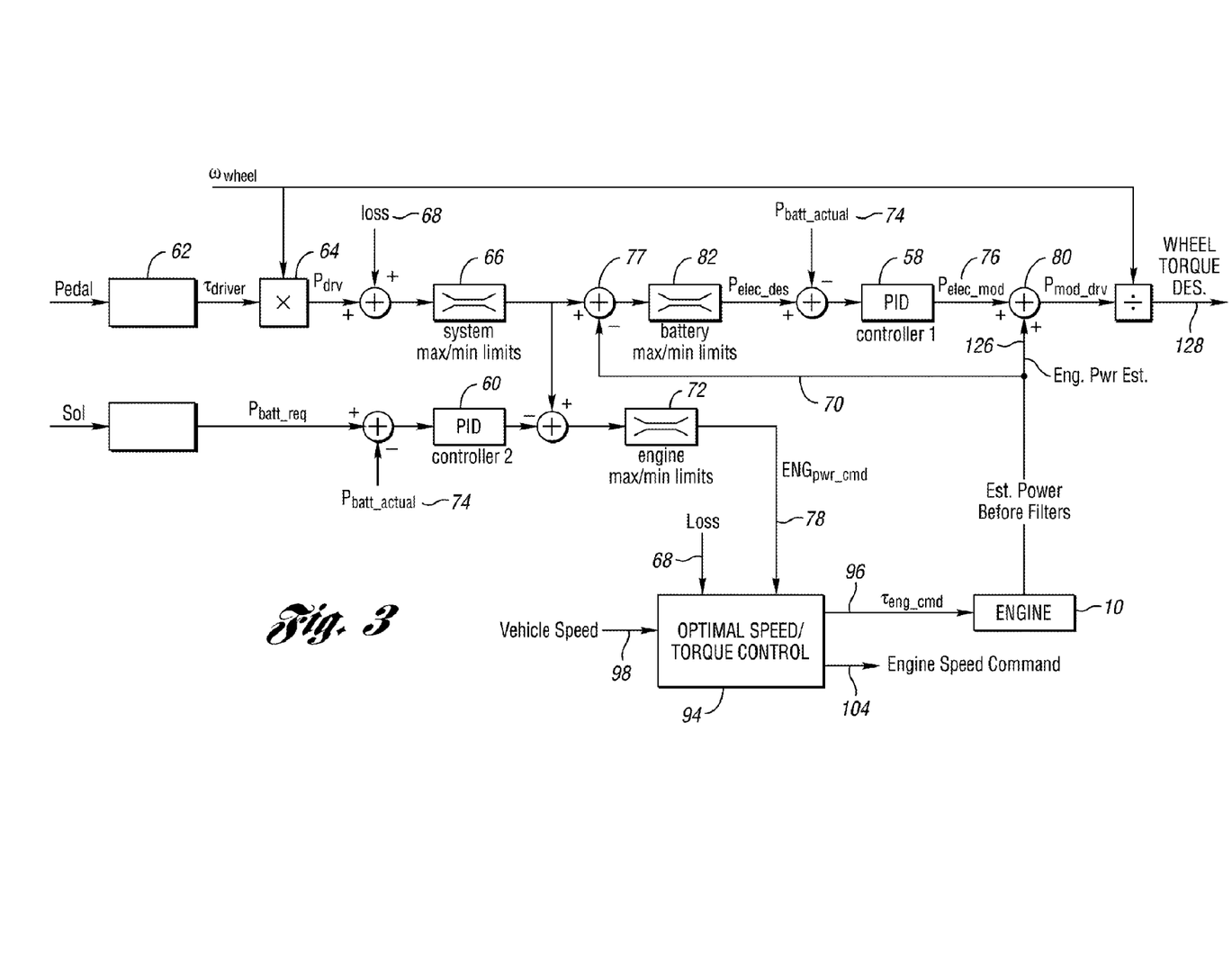
FIG. 3 is a diagrammatic representation of the elements used by the vehicle system controller in a determination of desired wheel torque, including the elements used in determining an estimated engine power.

FIG. 3 shows a schematic system diagram of the components of the vehicle system controller for developing an estimated engine power output without violating precalibrated maximum and minimum battery power limits and without violating calibrated maximum and minimum engine power limits.

As previously indicated, the two power sources are integrated so that they seamlessly work together to meet the driver's demand for power without exceeding the system's power limits, including battery limits, while maintaining optimum powertrain efficiency and performance. The system will determine a driver's demand for torque and achieve an optimum split of power between the two power sources. If the battery limits are exceeded and the battery voltage is outside of a specified range, powertrain system shutdown may occur. In order to avoid this condition without limiting the maximum vehicle performance, the control system coordinates the two power sources using a closed-loop power control. A closed-loop power control, as shown in FIG. 3, ensures a proper coordination between the two power sources.

The closed-loop block diagram of FIG. 3 shows a properly distributed total power request, which is the sum of the driver demand and the battery discharge and charge power request, to the two power sources.

FIG. 3 shows a first PID controller 58, which is a closed-loop controller that prevents actual battery power from exceeding defined limits. A second PID controller 60, using actual battery power as a feedback variable, ensures that the battery is being charged or discharged as intended by adjusting the engine power command.

The control system shown in FIG. 3 calculates the driver power demand ($P_{drv}$) based on the driver torque demand and wheel speed $\omega_{wheel}$. The driver torque demand, $T_{driver}$, is derived from accelerator pedal position using transducer 62. The wheel speed is obtained by a wheel speed sensor. The product of the wheel speed and the driver torque demand determines the driver power demand $P_{drv}$, as shown at 64.

Losses, $P_{loss}$, are powertrain losses, which comprise gearing losses and other mechanical losses as well as motor and generator electrical losses. After the losses are accounted for at 68 and the maximum system limits are determined at 66 and the engine output power determined at 70 is combined at 77 with the net driver power demand, the control system determines whether the battery power desired ($P_{elec\_des}$) is within battery limits. The engine power command is tested at 72 to determine whether it is within engine capability.

The actual battery power ($P_{batt\_actual}$) at 74 is used as a closed-loop feedback variable for controller 58 to ensure, by determining modified battery power desired ($P_{elec\_mod}$), as shown at 76, that the actual battery power satisfies battery power desired ($P_{elec\_des}$). Therefore, the actual battery power does not exceed battery limits.

The control system algebraically adds the values $P_{elec\_mod}$ and Eng Pwr EST, to determine the allowed driver demand $P_{mod\_drv}$. This sum will ensure that the maximum system capability is achieved without violating battery limits.

The control system calculates desired wheel torque, which is the driver torque command as limited to the system limits.

The second PID controller 60, as explained previously, adjusts the engine power command to ensure that the battery power request $P_{batt\_req}$ for an optimal energy management strategy is achieved. The first controller 58 may have a faster response than the second controller 60 to ensure control system stability.

If it is assumed, for example, that in a steady-state operating mode a driver requests 50 kw of power, after accounting for the electrical losses at 68, and that the engine power output at 70 is 50 kw, the battery power desired ($P_{elect\_des}$) will be zero. The battery power desired ($P_{elect\_des}$) is the difference between the value at comparator 66 and the engine estimated output power at 70. Depending upon whether the electrical loss estimate is equal to the actual electrical loss, it is possible, during steady-state operating conditions, that the output of controller 58 will be zero. This would cause the power at summing point 80 in FIG. 3 to be 50 kw.

If, for example, the driver requests a change from a power level of 50 kw to a power level of 70 kw after accounting for losses, and the engine limit is 50 kw, the battery will be called upon to supply 20 kw. If actual battery power at 74 is close to the battery power demand as limited by the comparator at 82, the value for $P_{elec\_mod}$ at 76 will be equal to or less than 20. The two values at 70 and 76 are summed at 80 to produce the desired wheel torque.

If the actual battery power at 74 exceeds the battery power demand permitted by the comparator 82, the value for $P_{elec\_mod}$ at 76 will be reduced at comparator 82 so that the value for $P_{mod\_drv}$ at 80 will be smaller, thereby ensuring that the battery power optimal energy management strategy is satisfied.

Figure 4:
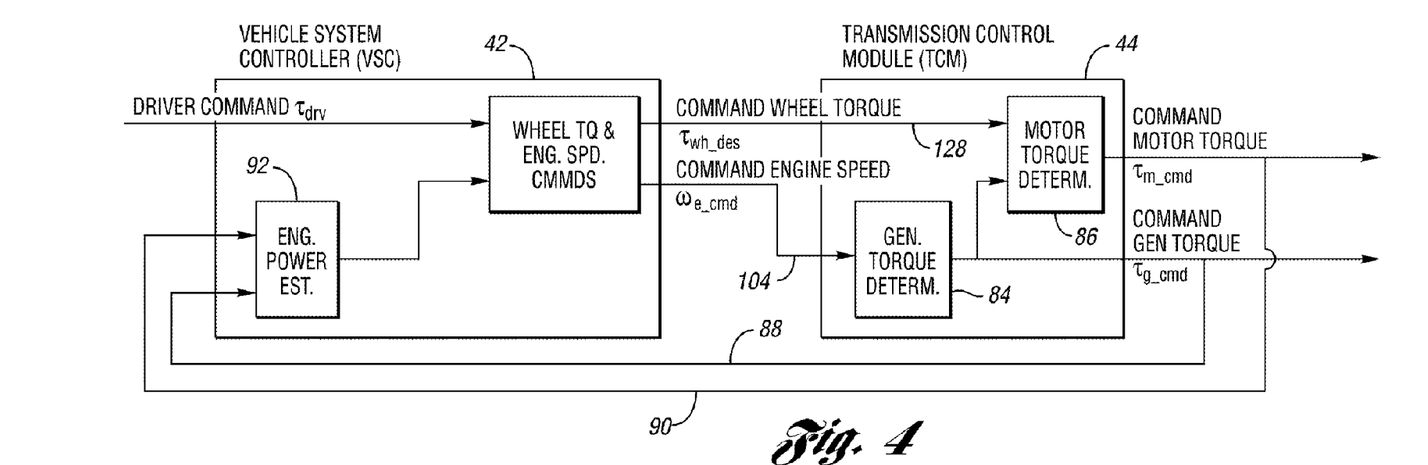
FIG. 4 is a simplified control system diagram showing an architecture for a motor torque and generator torque controller in a series-parallel hybrid electric vehicle.

FIG. 4 shows a simplified block diagram of a control system for a series-parallel hybrid electric vehicle powertrain of the kind illustrated in FIG. 1. Due to the characteristics of a series-parallel powertrain configuration of this type, the motor torque control must be coordinated in a closed-loop fashion with the generator torque command. This will ensure that the vehicle system controller wheel torque command is fulfilled. This closed-loop control is seen in FIG. 4 where the generator torque is determined by the transmission control module 44 at subsystem 84. This will be described with reference to FIG. 5a. Motor torque is determined by the transmission control module 44 at subsystem 86. Both the commanded motor torque and the commanded generator torque are distributed through signal feedback paths 88 and 90, respectively, to the vehicle system controller 42, where a raw engine power estimate is made at subsystem 92. According to a first embodiment of the invention, this power estimation is carried out by an algorithm as follows:

$$P_{eng\_est\_raw} = \left(\frac{T_{wh}}{K} - T_{mot}\right)\omega_{mot} - (T_{gen}\omega_{gen})$$

where $T_{mot}$ is motor torque, $\omega_{mot}$ is motor speed, $T_{gen}$ is generator torque, $\omega_{gen}$ is generator speed, and K is a fixed constant dependent on the gearing ratio between the motor and the wheels.

The estimated engine power, determined at 92, is distributed to a wheel torque and engine speed command calculation subsystem of the controller 42. The algorithm carried out at subsystem 92 is illustrated schematically in the block diagram of FIG. 5. In the engine power estimation technique of FIG. 5, the engine power estimation subsystem receives as input data the desired wheel torque ($T_{wh\_des}$), which is computed as described with reference to FIG. 3. It receives also a motor torque command ($T_{m\_cmd}$), as shown at 90 in FIG. 4, and a generator torque command ($T_{g\_com}$), as shown at 88 in FIG. 4. A motor speed command, which can be derived from measured vehicle speed, and generator speed ($\omega_g$) also are used as input variables.

An engine speed command 104 is developed by subsystem 94, seen in FIG. 3. Subsystem 94 receives an engine power command, determined as shown at 78 in FIG. 3, and a vehicle speed signal 98. Using this input data, the engine speed command is determined at 104. The engine torque command is distributed to the engine control 10 to develop an engine estimated power, seen in FIG. 3 at 126. This is the value for the engine power estimate before it is filtered, as will be explained subsequently with reference to FIG. 5. The result of the filtering is an estimated engine power used to determine desired wheel torque.

Figure 5:
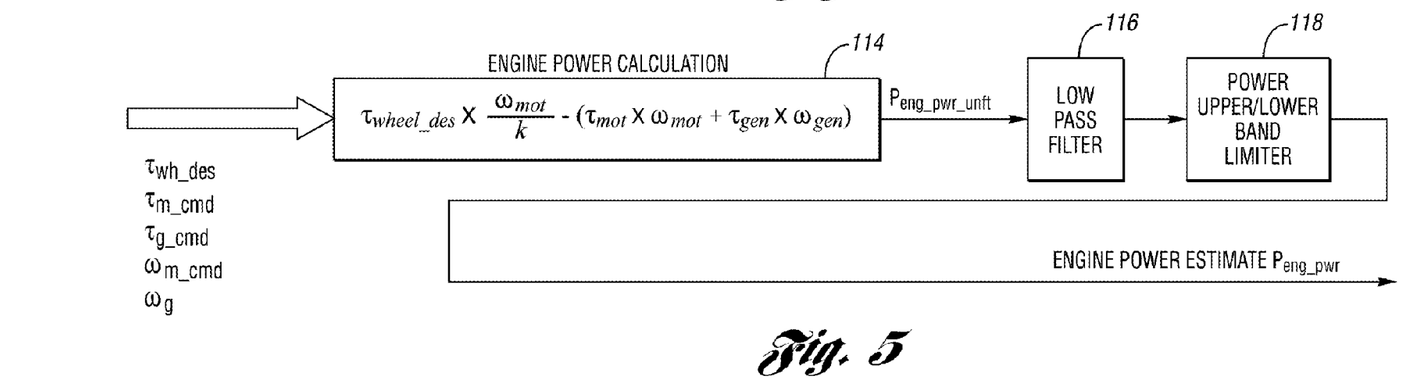
FIG. 5 is a simplified diagram of a portion of the diagram of FIG. 4 showing the step for calculating an estimated engine power.
Figure 5A:
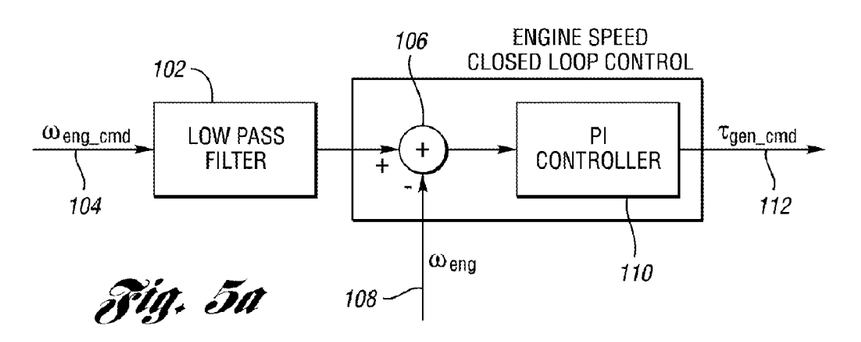
FIG. 5a is a schematic representation of elements used in determining a generator torque command.

The commanded generator torque used in the engine power calculation of FIG. 5 is derived as shown in FIG. 5a at 112, which illustrates an engine speed closed-loop control. It consists of a low pass filter 102, which receives an engine speed command, as shown at 104. The engine speed command, after filtering, is compared at 106 to measured engine speed at 108. A closed-loop proportional-integral (PI) controller 110 is used to develop a generator torque command at 112 using engine speed as a feedback variable.

Figure 5B:
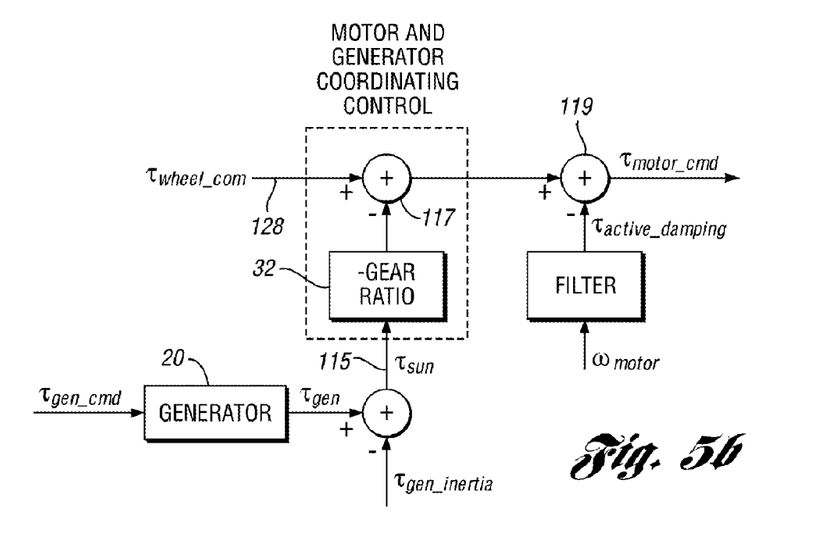
FIG. 5b is a schematic representation of a motor and generator coordinating controller for obtaining a motor torque command.

FIG. 5b schematically illustrates how a motor torque command ($T_{motor\_com}$) is determined. A driver wheel torque command at 113 is coordinated by the gearing with sun gear torque $T_{sun}$ at 115 by algebraically combining those values at 117. An active damping torque is combined at 119 with the torque value at 117 to produce the motor torque command.

The active damping torque is an output of a filter circuit using motor speed ($\omega_{motor}$) as an input, as indicated.

The output of the calculation at 114, previously described in the discussion of FIG. 5, is an unfiltered engine power. A filtering circuit 116 eliminates extraneous engine power values for the unfiltered engine power value determined in the calculation at 114. The filtered engine power value then is distributed to a power upper and lower band limiter circuit 118, which protects the system against estimates of engine power that exceed precalibrated limits.

According to a second embodiment of the invention, a generator inertia term is used, as previously mentioned. If both generator torque and generator inertia torque are used together to estimate current engine torque available to obtain estimated power, described with reference to FIG. 3, the engine torque can be expressed as follows:

$$T_{eng} = \left(T_{gen} - J_{gen}\frac{dw_{gen}}{dt}\right) \times K;$$

where:

$T_{gen}$=generator torque;

$J_{gen}$=generator inertia torque;

K=the gear ratio between the engine and the generator.

Using the estimated current engine torque, a total engine power available can be calculated as follows:

$$P_{eng} = T_{eng} \times \text{engine\_speed}$$

The inertia term indicated in the preceding equations is calculated using generator acceleration. Engine power estimated using these equations, therefore, is noisy, so heavy filtering is needed to obtain a useful value for wheel power or wheel torque. Alternately, an electronic digital processor with a high internal data processing speed is needed. Since the estimated engine power using the preceding equations uses generator torque distributed by a transmission control module, a delay exists between the actual generator torque and the generator torque that is read by the vehicle system controller, which can result in inaccuracies in the estimated engine power, as previously indicated. If the engine power estimated is filtered, there will exist a phase lag between the estimated engine power and the actual engine power. This phase delay may enhance the inaccuracy in the estimated engine power value during transient events. Although this procedure would be appropriate for use during steady-state operations, it may have limitations during transient operating conditions.

According to the first embodiment of the invention, engine power available can be calculated using the desired wheel torque, the current motor torque and the generator torque. Since the current motor torque and the generator torque, which are seen at 88 and 90 in FIG. 4, is distributed by the transmission control module over a control area network bus, they correspond to a desired wheel torque request sent by the transmission control module in a previous control loop to the vehicle system controller. In order to accommodate for this delay, the desired wheel torque used for calculating the engine power can be delayed by a calibrateable time using a buffer with a first-in/first-out (FIFO) characteristic and with a calibrated delta filter time constant. The delay is achieved by using a calibrated variable CAL, which will be described with reference to FIG. 7. This variable will delay the desired wheel torque command used in the calculation of current engine power at a sample time dependent upon the value of the calibrated variable CAL.

Since this method for calculating engine power does not use inertia terms, the engine power estimate does not require heavy filtering and the result is a less noisy signal that can be used for modifying desired commands during transient events, as well as steady-state operating events.

Figure 6:
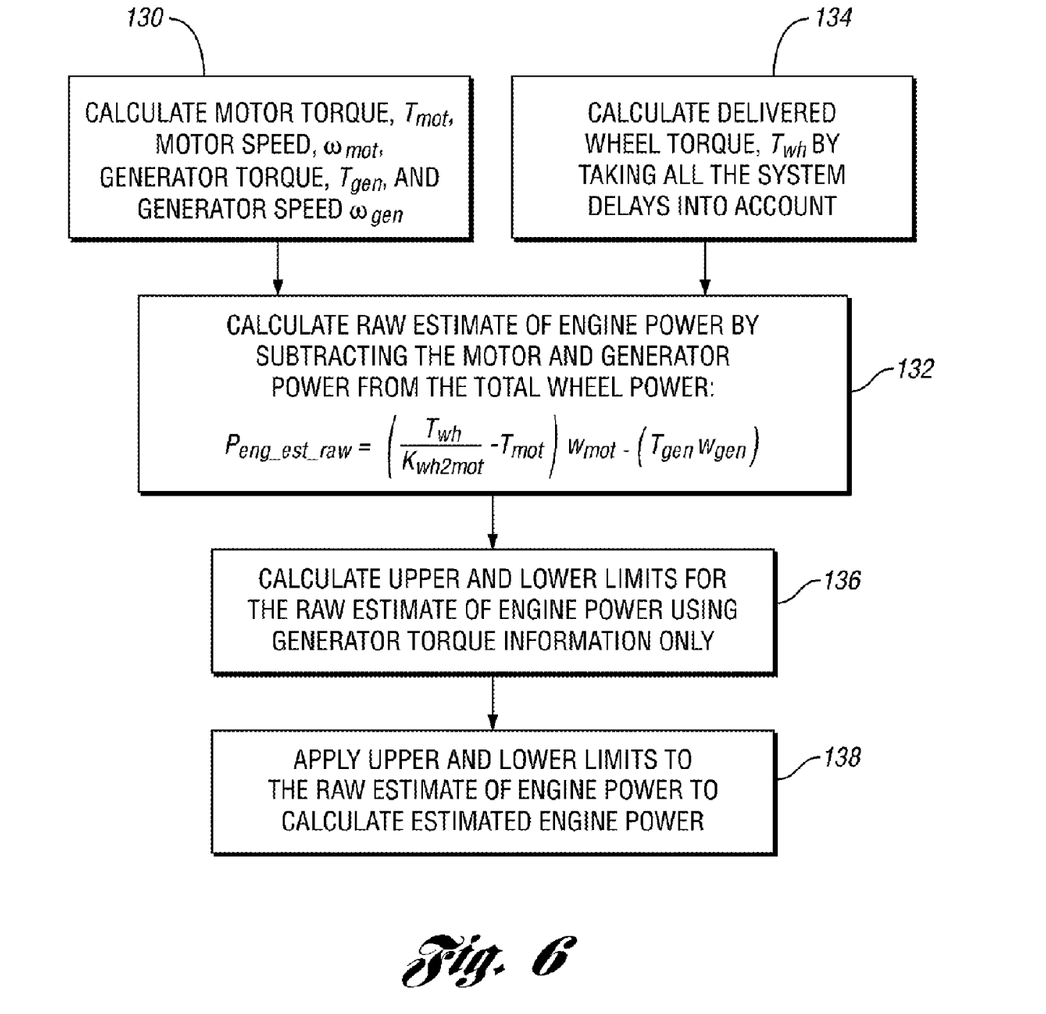
FIG. 6 is a flow diagram illustrating an engine power estimate calculation.

FIG. 6 is a flowchart showing the operating strategy for the engine power estimation procedure using the first embodiment of the invention. In FIG. 6, motor torque, motor speed, generator torque and generator speed are calculated at action block 130. Those variables are used in a calculation of the raw estimate of engine power, as shown at action block 132. The wheel torque calculated at action block 134 corresponds to the wheel torque, previously described with reference to FIG. 3. That value of wheel torque is used in the algorithm indicated at 132 in FIG. 6.

At action block 136, the upper and lower limits are calculated for the raw estimate of engine power using generator torque information. This will be described with reference to FIG. 7.

At action block 138, the upper and lower limits are applied to the raw estimate of engine power to calculate estimated engine power. This also will be described with reference to FIG. 7.

Figure 7:
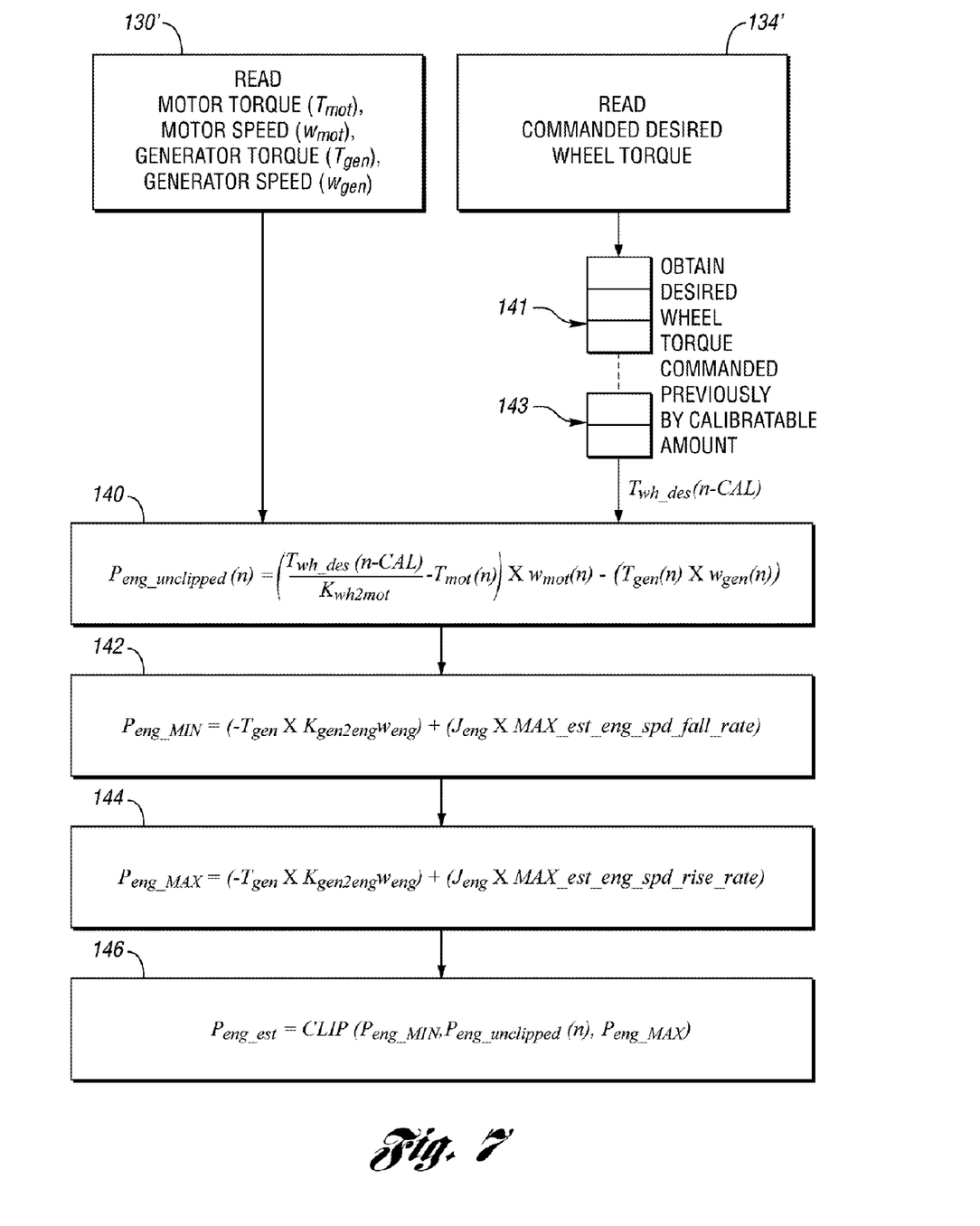
FIG. 7 is a flow diagram showing the algorithms used at the various steps indicated in FIG. 6.

In FIG. 7, the input variables are read at action block 130', which corresponds to the previously described action block 130 in the control routine of FIG. 6. At action block 134', the desired wheel torque is read. This was calculated at action block 134 of the routine of FIG. 6. That value is stored in random access memory storage registers (RAM) 141, but it is not read by the vehicle system controller during the current control loop. Instead, the vehicle system controller reads desired wheel torque values in RAM storage registers 143, which were recorded in a previous control loop of the controller. If the current loop is indicated by the symbol "n," the values in registers 143 will be equal to values read in control loop n minus a calibrated delay constant CAL. If the desired wheel torque is stored during the immediately preceding control loop, the value for CAL would be "1." If it is desired that the value for desired wheel torque is to be stored in the second preceding loop, the value for the calibrated constant CAL would be "2."

Using the information from action blocks 130' and 134', an unclipped value for the engine power is computed for the current control loop at action block 140. This corresponds to block 132 in FIG. 6. The unclipped engine power computed at 140 depends upon the difference in the desired wheel torque in an earlier background loop divided by a constant that depends on the wheel-to-motor gear ratio, minus the torque of the motor during the current loop. That quantity is multiplied by the motor speed during the current loop. The generator power then is calculated during the current loop, which is equal to generator torque during the current loop multiplied by generator speed. The difference in those two power values then equals the unclipped engine power during the current loop.

A calibrated minimum engine speed rate of decrease is taken into account at action block 142. This will account for engine inertia torque changes as the engine speed rate falls. The engine inertia torque is indicated in action blocks 142 and 144 by the symbol $J_{eng}$. Blocks 142 and 144 in FIG. 7 correspond to block 136 in FIG. 6.

The inertia torque value $J_{eng}$, multiplied by a calibrated maximum engine speed fall rate, when combined with the generator power value, will yield the minimum engine power value. The symbol $K_{gen2eng}$ at action block 142 is a calibrated constant depending on the gear ratio between the generator and the engine.

At action block 144, the maximum engine power is calibrated taking into account the maximum calibrated engine speed rise rate as the engine accelerates.

At action block 146, which corresponds to block 138 in FIG. 6, the engine power estimate is clipped in a given control loop "n" so that its value will fall between the maximum and minimum allowed engine power values.

Although embodiments of the invention have been described, it will be apparent to persons skilled in the art that modifications may be made without departing from the scope of the invention. All such modifications and equivalents thereof are intended to be covered by the following claims.

What is claimed is:

1. A method for estimating power in a powertrain for a hybrid electric vehicle to determine desired driving torque at vehicle traction wheels; the powertrain having a motor, a generator and gearing drivably coupling the engine, the motor and the generator to effect a divided power flow path from the engine to the vehicle traction wheels; and an electronic processor for controlling engine, generator and motor functions including powertrain data storage registers for storing, during successive control loops, repetitive time sampled data representing instantaneous engine speed, generator torque and motor torque;

the method comprising the steps of:
computing and storing in the registers a desired traction wheel torque in successive control loops;
a desired traction wheel torque during a given control loop being a function of driver torque command and motor and generator torque values stored in the registers during a control loop preceding a current control loop; and
computing engine power during a current control loop as a function of a delayed desired traction wheel torque value based upon the values of the motor torque and generator torque determined in a previous control loop whereby current computed engine power deviations due to transient powertrain operating conditions are reduced.

2. The method set forth in claim 1 wherein the current estimated engine power is computed by determining an initial raw estimate of engine power, the method further comprising the step of calculating upper and lower limits for the value of the initial raw estimate of engine power.

3. The method set forth in claim 2 wherein the initial raw estimated engine power is clipped to effect a final value for the estimated engine power whereby the final estimated engine power value is maintained within the upper and lower limits.

4. The method set forth in claim 2 including the step of determining an engine inertial torque value corresponding to maximum engine acceleration and an engine inertial torque value corresponding to maximum engine deceleration, the upper and lower estimated power limits being functionally related to engine inertial torque values.

5. The method set forth in claim 3 including the step of determining an engine inertial torque value corresponding to maximum engine acceleration and an engine inertial torque value corresponding to maximum engine deceleration, the upper and lower estimated power limits being functionally related to engine inertial torque values.

* * * * *